United States Patent [19]

Jardine

[11] Patent Number: 5,222,303
[45] Date of Patent: Jun. 29, 1993

[54] TEMPLATE FOR MARKING THE LOCATION OF JUNCTION BOXES

[76] Inventor: Stuart A. Jardine, 8909 Vista Gate, Dallas, Tex. 75243

[21] Appl. No.: 810,127

[22] Filed: Dec. 19, 1991

[51] Int. Cl.⁵ .......................... G01B 5/14; B25B 11/00
[52] U.S. Cl. .................................. 33/528; 33/DIG. 10
[58] Field of Search ................. 33/528, 429, 451, 484, 33/485, 194, 645, DIG. 10

[56] References Cited

U.S. PATENT DOCUMENTS

| | | |
|---|---|---|
| 1,612,455 | 12/1926 | McGeorge . |
| 3,672,064 | 6/1972 | Elkins et al. ............................ 33/528 |
| 3,842,510 | 10/1974 | Elliott .................................... 33/528 |
| 3,875,669 | 4/1975 | Hull ....................................... 33/528 |
| 3,954,717 | 5/1976 | Tarr ................................ 33/DIG. 10 |
| 4,126,944 | 11/1978 | Burkhart . |
| 4,177,569 | 12/1979 | Greer . |
| 4,228,592 | 10/1980 | Badger . |
| 4,285,135 | 8/1981 | Minozzi, Jr. ........................... 33/528 |
| 4,576,431 | 3/1986 | Thayer . |
| 4,700,489 | 10/1987 | Vasile ..................................... 33/451 |
| 4,791,731 | 12/1988 | Dickinson et al. ..................... 33/528 |
| 4,793,069 | 12/1988 | McDowell ............................. 33/528 |
| 4,888,880 | 12/1989 | Parker ................................... 33/645 |
| 4,944,096 | 7/1990 | Tolley .................................... 33/451 |
| 5,072,523 | 12/1991 | Bennett ................................. 33/528 |
| 5,092,057 | 3/1992 | Hoenig, Sr. ........................... 33/770 |

OTHER PUBLICATIONS

PVC Box Placement Tool (2 pages), (date unknown).

*Primary Examiner*—William A. Cuchlinski, Jr.
*Assistant Examiner*—C. W. Fulton
*Attorney, Agent, or Firm*—Richards, Medlock & Andrews

[57] ABSTRACT

A template for locating the proper placement of junction boxes and for marking a section of wall to be cut out to accommodate a junction box. The template comprises a first straight portion of designated length having a first end which is free and a second end defining an aperture which is about or slightly larger than the dimension of a junction box.

26 Claims, 4 Drawing Sheets

TEMPLATE FOR MARKING THE LOCATION OF JUNCTION BOXES

TECHNICAL FIELD OF THE INVENTION

This invention relates to a template used for the measuring of apertures for junction boxes or a group of junction boxes to accommodate switches, receptacles, telephone outlets, data outlets, etc. and which can also be used to locate the proper placement of a junction box or a group thereof on a wall stud.

BACKGROUND OF THE INVENTION

During a remodelling or new construction project, electricians or drywallers are required to mark the appropriate place on sheetrock or other wall materials where junction boxes and other electrical power and communication devices will be located and to cut out the marked area. During new construction drywallers or electricians may also have to mount boxes on the open side of walls. When measuring for the cut-out sections in walls or placement of boxes on the open side of walls the electrician or drywaller in practice has utilized a ruler to measure the appropriate height of the cut-out, and a junction box to trace the shape to be cut out. This practice often leads to the placement of junction boxes which are not level and are at improper heights. In addition to the junction box and ruler, electricians and drywallers have also used a third tool, a level, in an attempt to attain proper squaring of junction boxes and other electrical device boxes. This procedure not only requires three tools and several steps, but the squaring of the box is marginal at best since there is limited means for alignment, especially if a box is in the middle of a piece of 4×8 sheetrock. In addition, the marking and cutting out of junction box locations by this procedure requires a considerable amount of time and labor as a typical commercial installation calls for an approximate average of five devices per 100 square feet.

Due to the time constraints and high cost of labor involved in construction projects, there is a great need for a device which will expedite the locating and marking of cut-outs on new and existing walls to accommodate boxes for devices. The present invention meets this need by providing a template which assures the proper locating and marking of a section of wall which is to be cut out in order to accommodate junction boxes and other electrical power and communication devices. The present invention further provides a template to locate the proper marking of a wall stud for placement of a junction box.

SUMMARY OF THE INVENTION

The present invention provides a template device to mark where apertures in walls and ceilings for junction boxes should be located. Additionally, the present invention allows for the marking and proper placement of junction boxes on wall studs where bracket boxes are also used. In accordance with the teaching of the present invention, a novel junction box template for electricians and drywall contractors is provided by providing a template comprising a first portion having a first free end and a second end defining an aperture which is about or slightly larger than the dimensions of a junction box, said first portion having a predetermined length so as to allow said aperture to be positioned at a predetermined height above a floor or other horizontal surface. Most preferably said first portion is straight.

Another embodiment of the present invention has an aperture of sufficient size to accommodate multi-gang junction boxes.

A preferred embodiment of the present invention may further include a first portion having gradations. The novel template may further comprise leveling means allowing for square alignment of the aperture and/or means for locating metal studs behind finished walls. Another preferred embodiment of the invention further comprises a second portion attached to the free end of the first portion by means of a hinge or other attachment means which allows the second straight portion to be placed in and out of alignment with the first portion.

Yet another preferred embodiment of the present invention provides a first portion of predetermined length having a serration which allows a portion of the first portion to be broken off, thereby creating a template tool having a length which meets the needs of a particular construction project.

BRIEF DESCRIPTION OF THE DRAWINGS

A more complete understanding of the invention may be had by reference to the following detailed description when taken in conjunction with the accompanying drawings, wherein.

DETAILED DESCRIPTION

Figure 1:
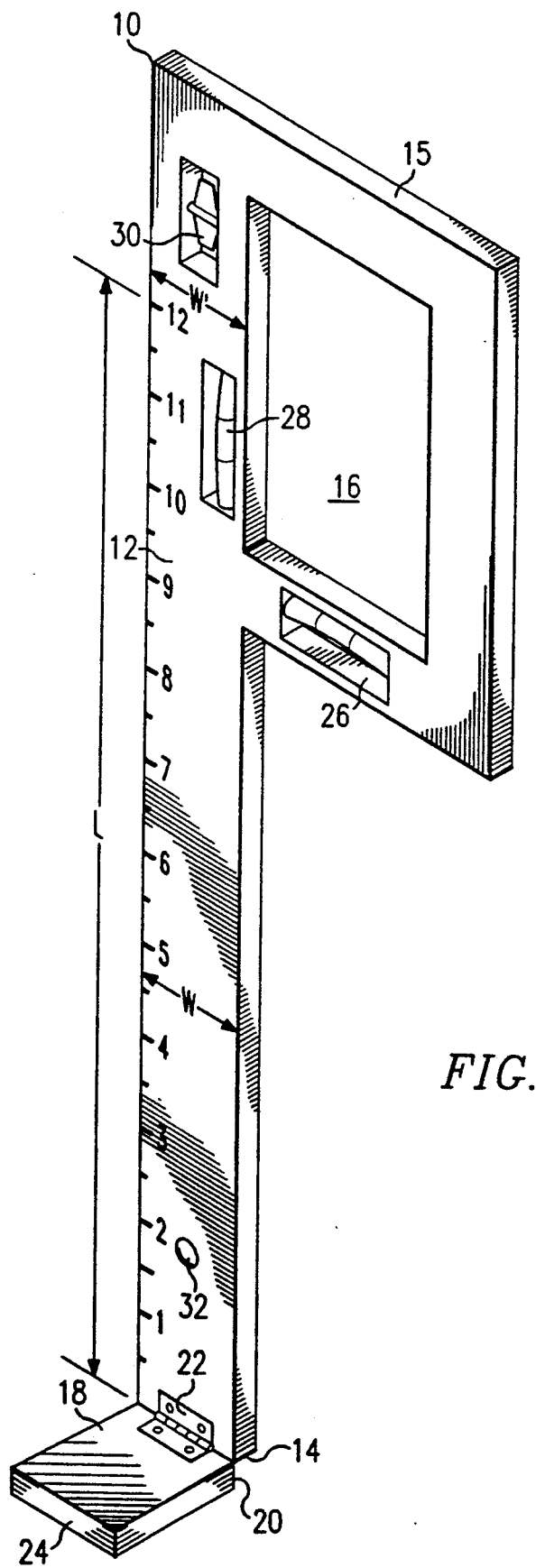
FIG. 1 illustrates the novel junction box template with various optional features which make the template a multipurpose tool.

A more detailed description of the invention is provided below by making reference to the attached figures. With reference to FIG. 1, a preferred embodiment of the invention will be described. The inventive junction box template 10 comprises a first portion 12, which is preferably straight, with a first end 14 which is free and a second end 15 defining an aperture of predetermined shape 16. The aperture 16 has a dimension about or slightly larger than the dimension (height and width) of a junction box or other electrical or communication device receptacle but smaller than a device cover plate, thereby allowing for the tracing of a shape of a junction box on a wall. Having a dimension slightly larger than the dimension of a junction box also allows the junction box to be fit through the aperture 16. Typical junction boxes and other electrical or communication device receptacles have standard dimensions of about 3 inches in height by about 2 inches in width. Multiple gang junction boxes differ only in width. For example, a double gang junction box would typically measure 3 inches high by 4 inches wide. Thus, alternative embodiments of the present invention provide an aperture slightly larger than the dimension of a multiple gang junction box. It is also preferred that aperture 16 has slightly greater dimensions than the standard junction box or multiple gang junction boxes to accommodate for errors such as an improper mounting of a bracket on a stud or other errors which are common on a construction project.

Preferably, the width (referenced as "w" in FIG. 1) of the first straight portion 12 is about ¾ of an inch or one half of the width of wall studs which typically measure 1½ inches in width. However, the width w of the first straight portion 12 may be greater or smaller than ¾ of an inch. Further, it is most preferable that the width between the inner edge of the aperture 16 and the edge of the first straight portion, shown as w', is about ¼ of an inch. The first portion 12 has a predetermined length so as to allow the aperture 16 to be positioned at a predetermined height above a floor or other horizontal surface. Preferably, the first portion 12 is such that distance between the free end 14 and the center of the aperture 16 (referenced as "L" in FIG. 1) is twelve inches, thereby allowing for the simple measuring and tracing of junction box locations for construction jobs which require junction box placements twelve inches from the floor to center. Optionally, where the construction job calls for junction box placements twelve inches from the bottom of the box to the floor, the length of the first portion 12 may be such that the distance between the free end 14 and the lower edge of the aperture 16 is twelve inches.

An alternative embodiment of the present invention which would allow for the tracing of a junction box shape either twelve inches to center or to bottom further comprises a second portion 18 having a first end 20 which is connected to the first free end 14 of the first portion 12 by means of a hinge 22 or other means which would allow said second portion 18 to be easily placed in and out of alignment with the first portion 12, and having a second free end 24. Preferably, said second portion 18 is straight. In accordance with this embodiment of the invention, the length of the first portion 12 would be such that the distance between the first free end 14 and the center of the aperture 16 measures 12 inches and the length of the second portion 18 (from first end 20 to second free end 24) measures approximately one half of the height of a standard junction box or 1½ inches. As such, when the first portion 12 is in alignment with the second portion 18 the distance from the free end 24 of the second portion 18 to the lower edge of the aperture 16 is 12 inches.

The present invention may further comprise a leveling means thereby allowing for square and accurate tracing of a junction box cut-out. The leveling means also allows the novel template to be used for any vertical or horizontal leveling application, thereby obviating the need for a separate leveling tool. Preferably, such leveling means comprise a first bubble-type level 26 which is in parallel relation to the upper and lower edges of aperture 16. Such leveling means may further comprise a second bubble-type level 28 which is in perpendicular relation to the first bubble-type level 26.

The present invention may also include gradations along the first portion 12, extending from the first end 14 to the second end of the first portion. Optionally, the novel junction box template 10 may further comprise a stud finder 30. These optional features of the novel junction box template make it a multipurpose tool. The gradations are extremely useful to an electrical contractor as they are often called upon during a typical construction project to bend electrical conduit. The gradations along the first portion act as a ruler thereby enabling the user to accurately bend conduit to its desired length angle. The stud finder eliminates the need for an additional tool often used in a typical construction job to locate metal studs behind walls.

Oftentimes a construction project will require the locating and tracing of cut-outs for junction boxes or other electrical device receptacles which are horizontal or at heights greater than the standard 12 inches to the center or bottom of the junction box, such as for electrical switches. To accommodate for such situations the first straight portion 12 may optionally have a hole 32 therethrough allowing a string of premeasured length with a weight attached to its end to be tied or otherwise connected to the template 10 thereby allowing for the horizontal or vertical placement of the template at the required height. In such an application, it is preferred that the template include the optional leveling means in order to assure accurate squaring of the template.

Figure 2:
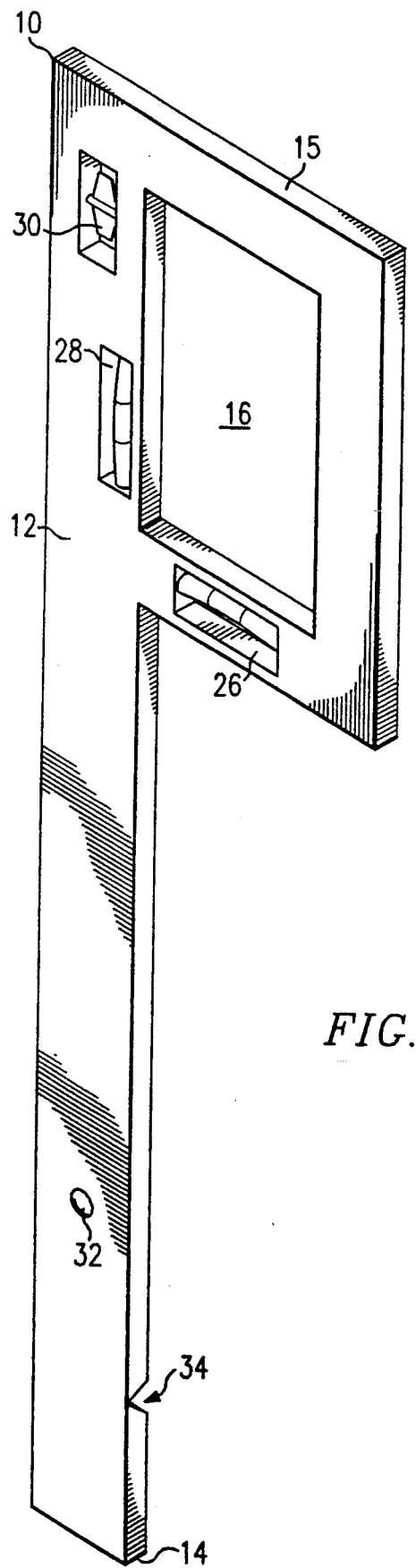
FIG. 2 illustrates a preferred embodiment of the invention wherein the first portion has serrations.

With reference to FIG. 2, an alternative embodiment of the present invention will be described. As previously noted, construction projects will typically require the placement of junction boxes either 12 inches from the floor to the center of the junction box or 12 inches from the floor to the bottom of the junction box. The alternative embodiment of the present invention depicted in FIG. 2 allows the first portion 12 of the novel template 10 to be broken down to the desired length for a particular construction job. Specifically, the first portion 12 may be marked with serration 34 which allows a portion of the first portion to be easily broken off at the serration. This allows the person in the field to create a template suitable for the particular construction project. Since a typical construction project requires placement of junction boxes either 12 inches to bottom or 12 inches to center of the junction box, the first portion 12 preferably has a serration 34 such that the distance between the center of aperture 16 and serration 34 is about 12 inches and the distance between the lower edge of aperture 16 and the first free end 14 is about 12 inches.

The novel template 10 may be made of any rigid material. Preferably, the template is made of plastic, or other nonconductive material. It is most preferred that the template be made of a clear plastic or plexiglass thereby allowing the optional gradations to be viewed from the back or front of the template.

Figure 3:
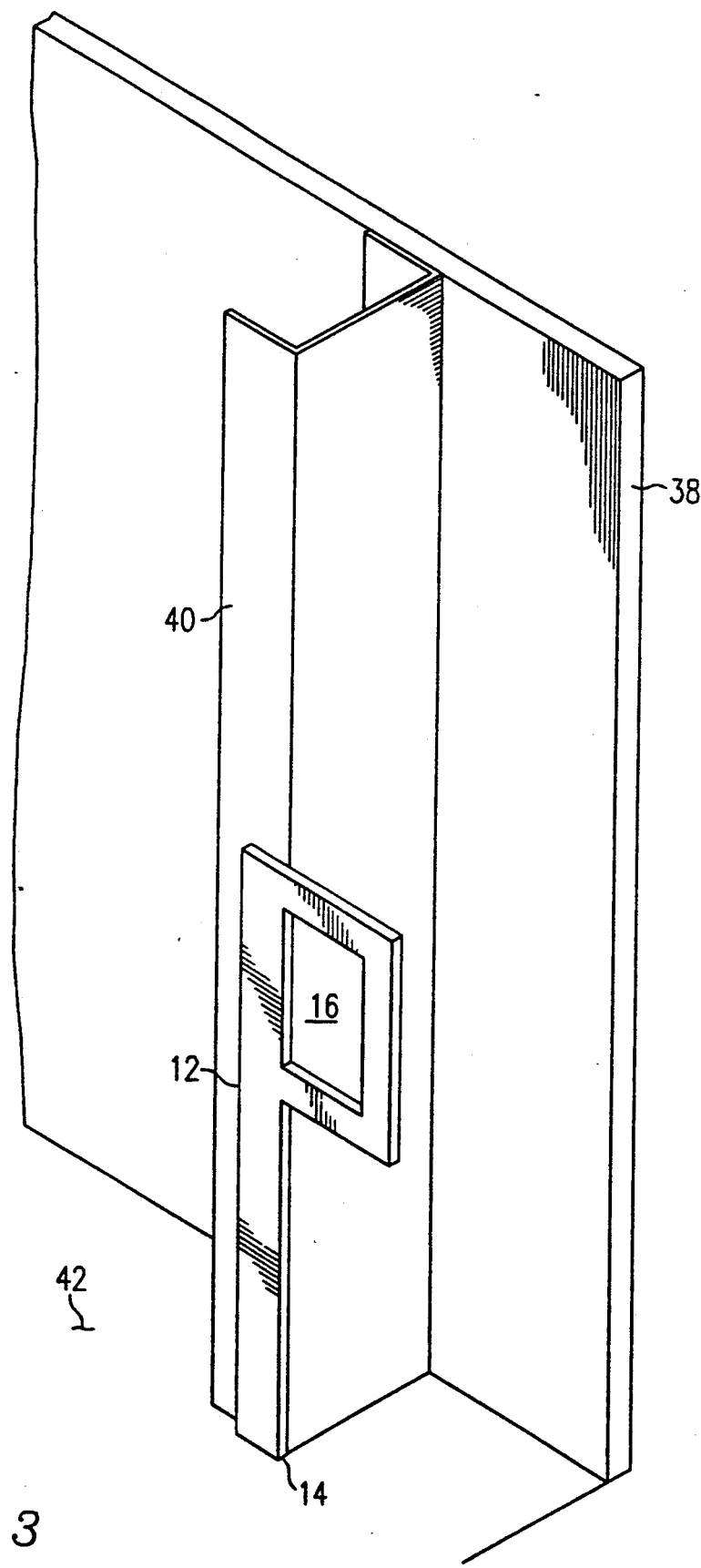
FIG. 3 illustrates a use of the novel template on the unfinished side of a wall.

With reference to FIG. 3, the use of the invention in locating the proper placement of a junction box in a typical construction application will be described. FIG. 3 depicts the use of the invention where open studs exist, i.e., where drywall 38 has only been nailed/screwed to one side (the back side) of the studs 40. The edge of the first portion 12 of the novel template 10 (having a preferred width of ¾ of an inch) is placed at the center of the stud 40 (having a width of 1½ inches) and the free end 14 abutting the floor 42. The user then either marks the stud for later mounting of the junction box or mounts a junction box to the stud using the template as a guide and holder for the junction box.

Figure 4:
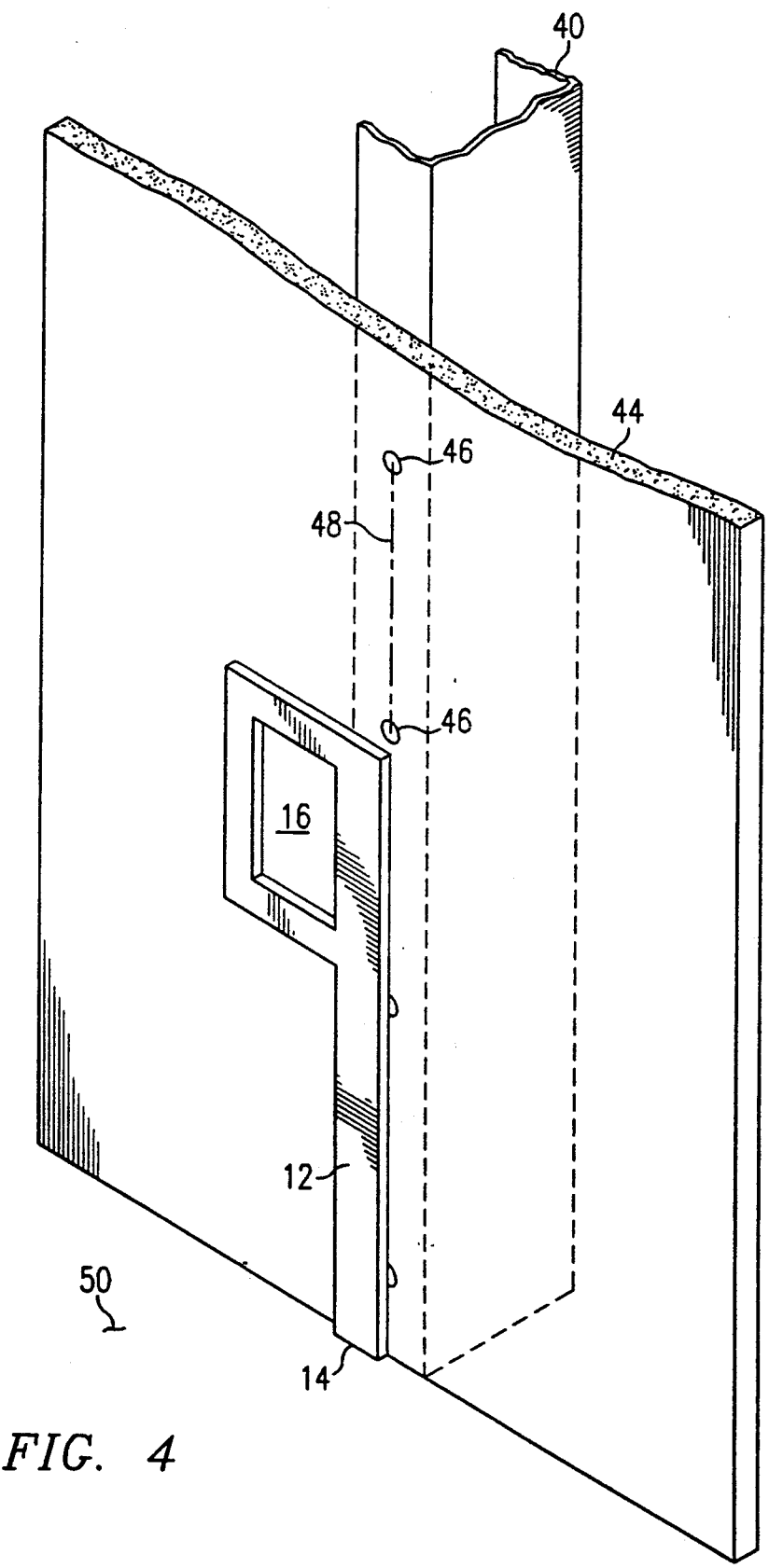
FIG. 4 illustrates a use of the novel template on the finished side of a wall.

The novel template may also be used for marking junction box cut-out locations on the finished side of a wall. Reference is made to FIG. 4 in describing such application. FIG. 4 depicts the placement of the novel template 10 for tracing a section of drywall 44 to be cut out. Typically, drywall 44 is screwed to the stud 40 with screws 46 which are visible. A line drawn through the screws 46 indicates the approximate centerline 48 of the stud 40. If the location of the junction box is to be to the left of the stud 40, the user simply aligns the edge of the first portion 12 with the centerline 48, with the free end 14 of the first portion 12 abutting the floor 50. The user then traces around the periphery or edges of the aperture 16, thereby marking the section of drywall to be cut out.

The above description is intended to describe the preferred embodiment and obvious variations would be apparent to those skilled in the art.

What is claimed is:

1. An improved junction box template for use in construction, said template comprising a first portion having a first free end and second end defining an aperture which is about or sightly larger than the dimension of a junction box, thereby allowing for the tracing of a shape of a junction box on a wall, said first portion having a predetermined length so as to allow said aperture to be positioned at a predetermined height above a floor or other horizontal surface and said first portion being made of a rigid material, thereby allowing a junction box to be held in place for mounting.

2. The junction box template of claim 1 wherein said first portion is straight.

3. The junction box template of claim 2 wherein said first straight portion is marked with gradations.

4. The junction box template of claim 2 further comprising a leveling means, thereby allowing for square alignment of said aperture.

5. The junction box template of claim 3 further comprising a leveling means, thereby allowing for square alignment of said aperture.

6. The junction box template of claim 2 wherein the width of said first straight portion is about ¾ of an inch.

7. The junction box template of claim 5 wherein the width of said first straight portion is about ¾ of an inch.

8. The junction box template of claim 2 wherein the width between the inner edge of said aperture and the edge of said first straight portion is about ¾ of an inch.

9. The junction box template of claim 5 wherein the width between the inner edge of said aperture and the edge of said first straight portion is about ¾ of an inch.

10. The junction box template of claim 2 further comprising a means for locating metal studs behind finished walls.

11. The junction box template of claim 5 further comprising a means for locating metal studs behind finished walls.

12. The junction box template of claim 2 wherein said first straight portion has a hole.

13. The junction box template of claim 5 wherein said first straight portion has a hole.

14. The junction box template of claim 2 wherein said aperture is about 3 inches in height by 2 inches in width.

15. The junction box template of claim 2 wherein said aperture is about 3 inches in height by 4 inches in width.

16. The junction box template of claim 2 wherein said first straight portion is of a length such that the distance between the first free end of said first straight portion and the center of said aperture is twelve inches.

17. The junction box template of claim 5 wherein said first straight portion is of a length such that the distance between the first free end of said first straight portion and the center of said aperture is twelve inches.

18. The junction box template of claim 2 wherein said first straight portion is of a length such that the distance between the first free end of said first straight portion and the lower edge of said aperture is twelve inches.

19. The junction box template of claim 5 wherein said first straight portion is of a length such that the distance between the first free end of said first straight portion and the lower edge of said aperture is twelve inches.

20. An improved junction box template for use in construction, said template comprising a first straight portion having a first free end and second end defining an aperture which is about or slightly larger than the dimension of a junction box, thereby allowing for the tracing of a shape of a junction box on a wall, said first straight portion having a predetermined length so as to allow said aperture to be positioned at a predetermined height above a floor or other horizontal surface and said first portion being made of a rigid material, said template further comprising a second straight portion of designated length, said second straight portion being connected to the first free end of said first straight portion by means of a hinge, thereby allowing said second straight portion to be placed in and out of alignment with said first straight portion.

21. An improved junction box template for use in construction, said template comprising a first straight portion having a first free end and second end defining an aperture which is about or slightly larger than the dimension of a junction box, thereby allowing for the tracing of a shape of a junction box on a wall, said first straight portion having a predetermined length so as to allow said aperture to be positioned at a predetermined height above a floor or other horizontal surface and said first portion being made of a rigid material and marked with gradations, said template further comprising a leveling means thereby allowing for square alignment of said aperture, said template further comprising a second straight portion of designated length, said second straight portion being connected to the first free end of said first straight portion by means of a hinge, thereby allowing said second straight portion to be placed in and out of alignment with said first straight portion.

22. An improved junction box template for use in construction, said template comprising a first straight portion having a first free end and second end defining an aperture which is about or slightly larger than the dimension of a junction box, thereby allowing for the tracing of a shape of a junction box on a wall, said first straight portion having a predetermined length so as to allow said aperture to be positioned at a predetermined height above a floor or other horizontal surface and said first portion being made of a rigid material, said template further comprising a second straight portion of designated length, and a means for connecting said second straight portion to the first free end of said first straight portion which allows said second straight portion to be placed in and out of alignment with said first straight portion.

23. An improved junction box template for use in construction, said template comprising a first straight portion having a first free end and second end defining an aperture which is about or slightly larger than the dimension of a junction box, thereby allowing for the tracing of a shape of a junction box on a wall, said first straight portion having a predetermined length so as to allow said aperture to be positioned at a predetermined height above a floor or other horizontal surface and said first portion being made of a rigid material and marked with gradations, said template further comprising a leveling means thereby allowing for square alignment of said aperture, said template further comprising a second straight portion of designated length, and a means for connecting said second straight portion to the first free end of said first straight portion which allows said second straight portion to be placed in and out of alignment with said first straight portion.

24. An improved junction box template for use in construction, said template comprising a first straight portion having a first free end and second end defining an aperture which is about or sightly larger than the dimension of a junction box, thereby allowing for the tracing of a shape of a junction box on a wall, said first straight portion having a predetermined length so as to allow said aperture to be positioned at a predetermined height above a floor or other horizontal surface and further wherein said first straight portion is marked with serrations which allow a portion or portions of said first straight portion to be broken off at said serrations.

25. An improved junction box template for use in construction, said template comprising a first straight portion having a first free end and second end defining an aperture which is about or slightly larger than the dimension of a junction box, thereby allowing for the tracing of a shape of a junction box on a wall, said first straight portion having a predetermined length so as to allow said aperture to be positioned at a predetermined height above a floor or other horizontal surface and further wherein said first portion is marked with gradations and is marked with a serration which allows a portion of said first straight portion to be broken off at said serration, said template further comprising a leveling means thereby allowing for square alignment of said aperture.

26. The junction box template of claim 25 having a serration such that the distance between the center of the aperture and said serration is about 12 inches and the distance between the lower edge of the aperture and the first free end of said first straight portion is about 12 inches.

* * * * *